United States Patent
Shaffer et al.

(10) Patent No.: US 7,181,027 B1
(45) Date of Patent: Feb. 20, 2007

(54) NOISE SUPPRESSION IN COMMUNICATIONS SYSTEMS

(75) Inventors: Shmuel Shaffer, Palo Alto, CA (US); Alex Yiu-Man Chan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/573,128

(22) Filed: May 17, 2000

(51) Int. Cl.
*H04B 15/00* (2006.01)

(52) U.S. Cl. ............................ 381/94.1; 379/406.01; 375/346

(58) Field of Classification Search ............. 381/94.1, 381/58; 379/406.01; 375/254, 346; 704/233; 455/88, 416
See application file for complete search history.

(56) References Cited

U.S. PATENT DOCUMENTS

| | | | |
|---|---|---|---|
| 4,388,730 A | 6/1983 | Nash et al. | 455/208 |
| 4,414,432 A | 11/1983 | Skerlos et al. | 179/2 |
| 4,985,925 A | 1/1991 | Langberg et al. | 381/72 |
| 5,533,120 A | 7/1996 | Staudacher | 379/392 |
| 5,734,713 A | 3/1998 | Mauney et al. | 379/395 |
| 6,175,634 B1 * | 1/2001 | Graumann | 381/94.1 |
| 6,212,275 B1 | 4/2001 | Akhteruzzaman | 379/421 |
| 6,424,942 B1 * | 7/2002 | Mustel et al. | 704/233 |
| 6,453,042 B1 | 9/2002 | Roach et al. | 379/395 |

* cited by examiner

*Primary Examiner*—Vivian Chin
*Assistant Examiner*—Con P. Tran
(74) *Attorney, Agent, or Firm*—Baker Botts L.L.P.

(57) ABSTRACT

A communications system contains a network linking a number of communications devices participating in a communications session. During the communications session, the communications devices share information indicating when participants are speaking. Based on this information, the communications devices control output levels to suppress the output of spurious signals during the communications session.

31 Claims, 3 Drawing Sheets

NOISE SUPPRESSION IN COMMUNICATIONS SYSTEMS

TECHNICAL FIELD OF THE INVENTION

The present invention relates generally to communications systems and more particularly to noise suppression in communications systems.

BACKGROUND OF THE INVENTION

When using a speaker phone, interference, such as feedback, often reduces the quality of communications. To combat feedback and other distortions in the communications, speaker phones may use signal processing techniques to separate valid communications from system noise. In addition, many speaker phones disable the speaker when input is received by the microphone. This prevents the speaker and the microphone of the speaker phone from forming a feedback loop, but often results in choppy conversations.

Signal processing techniques offer an intelligent method for reducing feedback and other system noise. However, signal processing methods increase both the complexity and the cost of a speaker phone. Also, computers are increasingly used as speaker phones, yet computer sound cards controlling input and output typically provide insufficient resources for complex signal processing.

SUMMARY OF THE INVENTION

In accordance with the present invention, techniques for noise suppression in communications systems are provided that substantially eliminate or reduce disadvantages and problems associated with previous techniques. In a particular embodiment, the present invention satisfies a need for a communications device that suppresses the output of spurious signals during a communications session.

According to one embodiment of the present invention, to communicate with a remote device, a method receives a remote input notification indicating that a remote device has received an audio input, receives a signal encoding the audio input from the remote device, enables a local output component responsive to the notification, and generates an output using the local output component based on the signal and the output level.

In accordance with another embodiment of the present invention, a voice communications device includes an output component that generates output at an output level, an interface, and a controller. The controller establishes a communications session with a remote device using the interface. The controller also receives a remote input notification from the remote device, wherein the remote input notification indicates that the remote device has received an audio input, and, responsive to the remote input notification, enables the output component. The controller also receives a signal encoding the audio input from the remote device and generates an output based on the signal using the output component.

The invention provides a number of technical advantages. Using efficient techniques, the system reduces the output of feedback, echos, and other erroneous signals. By sharing operational information among participants in a communications session, devices may suppress the output of spurious signals and increase the quality of communications. This remote signaling of information allows each device participating in a communications session to control the output of its speaker to produce sounds only when another participant in the session is communicating valid signals. The techniques disclosed are appropriate for communications sessions involving any number of participants. Moreover, these techniques may be incorporated into devices using other quality enhancing techniques.

Other technical advantages of the present invention will be readily apparent to one skilled in the art in the following figures, descriptions, and claims.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
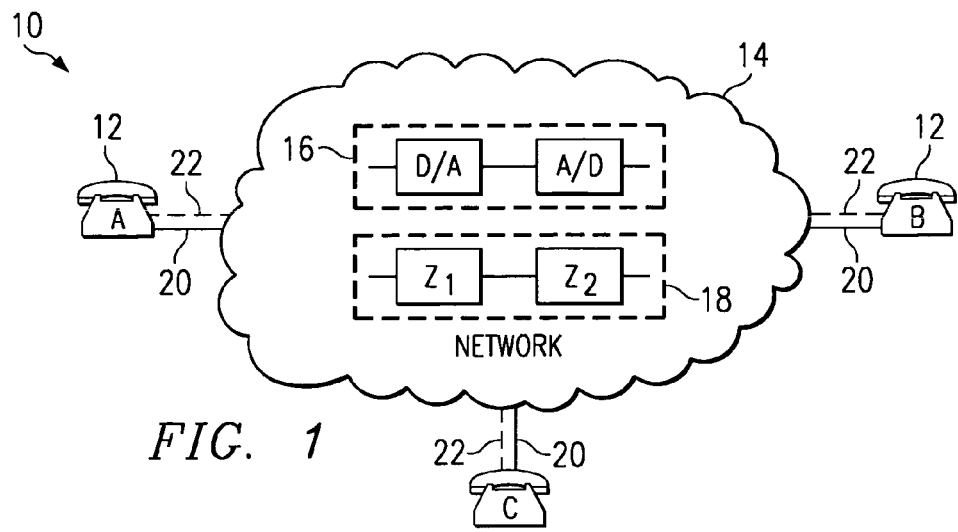
FIG. 1 is a block diagram illustrating a system having communications devices in accordance with the teachings of the present invention.

FIG. 1 illustrates a communications system, indicated generally at 10, that includes communications devices 12 coupled via a network 14. In general, devices 12 reduce the output of spurious signals in communications by sharing operational information among participants in a communications session. In a particular embodiment, this shared information allows devices 12 to enable audio output at appropriate times, thus suppressing the output of noise at all other times.

Devices 12 represent hardware and/or software for communicating voice, data, video, signaling, and/or other information with remote devices using network 14. Users of system 10 may use devices 12 to establish communications sessions, for example, to place telephone calls. Devices 12 couple to network 14 using any suitable wireless or wireline link. In a particular embodiment, device 12 is a personal computer (PC) operating as a speaker phone. Devices 12, using any appropriate analog or digital communications protocol, form links using network 14 to facilitate communications sessions between multiple users of system 10.

Network 14 represents any collection and arrangement of hardware and/or software providing communications between devices 12 as well as between other devices. For example, network 14 may be one or a collection of components associated with the public switched telephone network (PSTN), local area networks (LAN), wide area networks (WAN), a global computer network such as the Internet, or other suitable wireline or wireless communications technology that supports communications between multiple devices. Network 14 supports communications between devices 12 using analog and/or digital transmission protocols. Moreover, different devices 12 may link to network 14 using various techniques and protocols. For example, a first device 12 may be coupled to network 14 using a packet-based communications protocol, while a second device 12 links to network 14 using a circuit-switched protocol. Network 14 facilitates communications between any number of devices 12 using appropriate communications protocols.

During communications between devices 12, interference and improper operation of elements within system 10 may negatively impact the quality of transmissions. Quality is degraded when the introduction of spurious signals into communications results in the output of noise. Spurious signals are any additional, altered, erroneous, or otherwise unintended signals affecting a device participating in a communications session. Spurious signals may result from interference, elements within network 14, links between devices 12 and network 14, elements within devices 12, or from other sources in system 10.

For example, device 12 may generate spurious signals caused by a feedback loop between a speaker and a microphone. Also, other elements within device 12 and throughout system 10 may create spurious signals. In the example shown, network 14 contains a first link 16 and a second link 18 that illustrate potential sources of spurious signals. First link 16 converts signals for transmission from digital to analog and then back to digital. During these conversions, or through interference on the analog link, spurious signals may be introduced into communications. Moreover, conversions between analog and digital signals may occur at any suitable location in system 10. In a particular embodiment, components within devices 12 perform these conversions. Therefore, spurious signals from analog/digital conversions may be introduced through the operation of devices 12 and/or other components in system 10.

Second link 18 illustrates a link between two devices with different impedances. The impedance mismatch between these devices may introduce spurious signals into communications. These examples illustrate common problems that may result in spurious signals in communications. However, errors in communications may result from any number of causes and sources. The error suppression techniques of devices 12 operate effectively against virtually any type of spurious signal, regardless of the source, preventing the output of many of these spurious signals to participants in a communications session. In operation, two or more devices 12 establish a communications session having a media path 20 and a signaling path 22. Media path 20 transports information such as audio, video, and data between participants in the communications session. Signaling path 22 provides a link for controlling transmissions on media path 20 and for communicating information describing the operation of devices 12 participating in the communications session. By sharing operational information among participants in a communications session, devices 12 may suppress the output of spurious signals in communications.

In a particular embodiment, the operational information shared provides a notification when audio input is received by device 12 from a participant in a communications session. This notification, generated by device 12 receiving the input, allows other devices 12 to enable their speakers to output audio signals received on media path 20. When the input notification times out or an end of input is signaled, devices 12 disable their speakers to prevent the output of spurious signals. Thus, device 12 defaults its speaker to a disabled state, and enables the speaker when a remote participant in the communications session speaks. Alternatively, device 12 may default its speaker to an enabled state, and then disable the speaker when a notification indicates that no audio input is detected from remote participants.

For example, consider a communications session between device 12 labeled A (device A) and device 12 labeled B (device B). Communications such as voice signals pass between device A and device B using media path 20, and signals pass between these devices on signaling path 22. Initially, both device A and device B default their speakers to disabled. If device A detects speech, device A transmits an input notification on signaling path 22 and a signal encoding the speech on media path 20. Upon detecting the input notification from device A, device B enables its speaker, thus allowing the output of the encoded speech signal received on media path 20.

When the end of detected speech is indicated, device B disables its speaker to prevent the output of spurious signals received on media path 20. Device A may explicitly generate this end of speech indication, or device B may assume that device A has stopped receiving audio input given the lapse of a predetermined period of time since the receipt of an input notification. If device A and device B both send input notifications, then both devices will enable their speakers responsive to the notification received from the other device, and users of both devices will know that more than one person is speaking.

These techniques may be used for any number of participants in a communications session. Consider a session between device A, device B, and device 12 labeled C (device C). All three devices default their speakers to disabled. If device A detects speech input by its own microphone, device A transmits an input notification on signaling path 22 and a signal encoding the speech on media path 20. Upon detecting the input notification from device A, device B and device C enable their speakers, thus allowing the output of the encoded speech signal received on media path 20.

When the end of detected speech is indicated, either explicitly by device A or implicitly by a timeout, device B and device C disable their speakers to prevent the output of spurious signals received on media path 20 or from their own components. If explicit end of speech indications are used, each participating device must track which device or devices communicated an input notification, and only when all of these devices indicate an end of input may the speaker be disabled. For example, if both device A and device B communicate input notifications, then both devices must also communicate an end of input before any participant should disable its speaker.

Using timeouts to indicate the end of input may simplify the process. For example, while the user of device A is speaking, device A periodically communicates an input notification. When device B and device C have not received an input notification for a given period of time, they may assume that no one is speaking and disable their speakers. Using this technique, participants need not distinguish between notifications received from different remote participants. Rather, a participant tracks the time since the last notification was received. Thus, if device A discontinues input notifications but device B detects input and begins communicating notifications, device C never disables its speaker (so long as the lapse between device A and device B does not exceed the timeout). As with the example involving two participants, when more than one participating device detects input, all participants will enable their speakers. Just as in a regular conversation, this results in all participants hearing what each other participant is saying, indicating that at least one participant should stop speaking.

Figure 2:
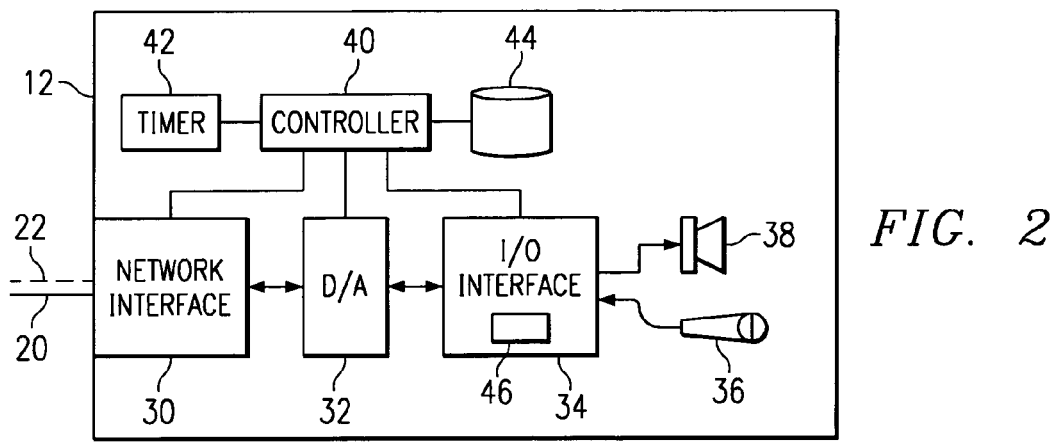
FIG. 2 is a block diagram illustrating an exemplary communications device for the system.

FIG. 2 illustrates the functional components of an exemplary device 12. Device 12 contains modules for controlling internal components of device 12 and for providing communications paths and signaling with remote communications equipment. Within device 12, audio signals flow between a network interface 30, a digital/analog (D/A) converter 32, an input/output (I/O) interface 34, a microphone 36, and a speaker 38. A controller 40 controls the operation of elements in device 12, and may access a timer 42 and a memory 44 to aid in control and communications. In general, device 12 receives audio signals using microphone 36 and outputs audio signals using speaker 38. Controller 40 controls the communication of these signals to and from remote devices and controls the operation of elements within device 12 based in part on remote signaling. By enabling and disabling speaker 38 at appropriate times, controller 40 may suppress the output of spurious signals during communications sessions.

Network interface 30 provides an interface between device 12 and network 14 implementing any suitable communications protocol to communicate media and signaling. For example, network interface 30 may be a modem, network interface card (NIC), interface port, telephone connector, or other suitable device for wireline or wireless connectivity to other equipment. D/A converter 32 converts signals from digital to analog and from analog to digital, allowing device 12 to support digital communications, such as packet-based voice communications sessions. Although the example shown includes D/A converter 32, system 10 contemplates device 12 supporting digital and/or analog communications.

For input and output, device 12 contains microphone 36 and speaker 38. Microphone 36 represents any input device for receiving audio input, and speaker 38 represents any output device for generating audio output. I/O interface 34 controls the operation of microphone 36 and speaker 38. This control, based on commands received from controller 40, provides for the receipt of audio signals using microphone 36 and the output of audio signals using speaker 38. To facilitate control of speaker 38, I/O interface 34 maintains an output level that indicates a range for output generated by speaker 38. For example, this output level may serve to indicate the maximum volume for output generated by speaker 38. By controlling the output level, device 12 can enable or disable speaker 38, with the output level specifying an intensity range for the output of speaker 38. For example, controller 40 may set the output level to zero to, in effect, "turn off" speaker 38. Controller 40 may then enable speaker 38 by increasing the value of the output level.

In addition, I/O interface 34 contains an input detector 46 that detects when an audio input received by microphone 36 exceeds an input level threshold. For example, input detector 46 may detect when a user of device 12 is speaking. The values of both the output level and the input level threshold may be set by controller 40, by other devices in system 10, or by a user of device 12. Furthermore, although both I/O interface 34 and input detector 46 are illustrated in the analog stream, one or both of these components may be on the digital side of D/A converter 32. In a particular embodiment, I/O interface 34 is a sound card in a computer.

Controller 40 controls the operation, administration, and management of functional units in device 12. In operation, controller 40 may access timer 42 and information stored in memory 44. For example, controller 40 may be a processor executing software stored on memory 44. However, controller 40 may be implemented using any suitable combination of hardware and/or software. Memory 44 stores software and data for use by device 12. Memory 44 may be any one or combination of volatile or non-volatile devices suitable for storing data, for example, random access memory (RAM) devices, read only memory (ROM) devices, magnetic storage devices, optical storage devices, or any other suitable data storage devices.

Memory 44 may store user configured parameters for thresholds, timing, and volume levels, operational information from other participants, and any other appropriate information. For example, memory 44 may store a volume level that controller 40 uses when enabling speaker 38. Moreover, memory 44 may store information for communication to a remote participant in a communications session or may store information received from a remote device. For example, memory 44 may store video files, documents, or other files transmitted between participants in a session.

In operation, two or more devices 12 at remote locations establish a communications session. During this session, each device 12 transmits signals encoding audio input received by its microphone 36 to the other participants using media path 20. Upon receiving an audio signal over media path 20, device 12 outputs the signal using its speaker 38, if speaker 38 is enabled. As previously discussed, interference, defects, or other improper operation of elements in system 10 may introduce spurious signals into media path 20. To combat these spurious signals, devices 12 participating in the communications session share operational information using signaling path 22.

Within each device 12, controller 40 tracks audio input received by microphone 36 using input detector 46. When controller 40 detects input of a sufficient level received by local microphone 36, device 12 notifies the other devices 12 participating in the communications session using an input notification. Thus, each participant generates input notifications to indicate the detection of audio input by its local microphone 36. Based on the audio input notifications received from remote participants, devices 12 enable and disable their respective speakers 38. This restricts output from speaker 38 to those times when other participants in the communications session are transmitting valid signals. Thus, the output of spurious signals will be reduced or eliminated while other participants are not speaking. When multiple participants speak at the same time, all the participants will enable their speakers 38. However, the resulting output of multiple signals serves, just as in a regular conversation, as an indicator that at least one person talking should stop speaking. In addition, these methods may be used in conjunction with other noise reduction techniques to minimize the output of spurious signals while speaker 38 is enabled.

In addition to sending input notifications, system 10 contemplates participants in a session sharing other operational information. For example, in a video conference, the each device 12 may use the shared information to determine which video stream to display. Also, operational information may contain identifying information giving details about the current speaker, such as name, affiliation or other appropriate data. However, the following descriptions detail the operation of a particular embodiment in which operational information contains input notifications.

Controller 40 determines when to generate notifications based on audio input received by local microphone 36. In a particular embodiment, controller 40 uses input detector 46 to determine when input received using microphone 36 exceeds an input level threshold. This input level threshold represents any appropriate value used by controller 42 to aid in detecting audio input, such as a power level that, when exceeded, indicates that local microphone 36 has received input. In addition, controller 40 may use timer 42 to determine the length of time that the input received exceeds the input level threshold. When the audio input exceeds the input level threshold for longer than an input time threshold, controller 40 generates an input notification and communicates this notification to other devices 12 participating in the communications session. Similarly, when the audio input falls below the input level threshold for a given period of time, controller 40 may notify other participants in the communications session that audio input is no longer detected.

Alternatively, controller 40 may periodically generate input notifications so long as audio input exceeding the input level threshold is detected. This provides a stream of notifications that, when no longer generated, indicates the end of the input. For example, while a user is speaking, controller 40 generates an input notification and communicates this notification to other participants each second. In this example, if any device 12 goes more than one second without receiving an input notification, it may determine that no other participants in the communications session are currently speaking. Thus device 12 may enable speaker 38 when an input notification is received, and then disable speaker 38 after a predetermined period of time has passed without receiving another input notification.

To reduce the output of spurious signals during a communications session, device 12 uses input notifications received from other participants in the communications session in controlling the operation of speaker 38. During the communications session, controller 40 determines a default value for the output level of speaker 38 that will prevent all or substantially all output. Thus, while the output level is set to this default value, speaker 38 will be disabled and will not output spurious signals. However, this default value may allow for minimal audio output from speaker 38 to provide comfort noise, which prevents a user from incorrectly determining that a connection is dead based on complete silence.

When device 12 receives a remote input notification, controller 40 increases the output level to enable speaker 38. For example, controller 40 may access the maximum output level maintained in memory 44 and increase the output level to this value. When enabled, speaker 38 may output any audio signals received on media path 20. Upon the receipt of an end of input notification, or if a predetermined period of time has passed since receiving an input notification, controller 40 returns the output level to the default value to disable speaker 38. Thus, controller 40 manages the output level such that speaker 38 is enabled only while participants at other locations are speaking.

During a communications session, device 12 maintains both media path 20 and signaling path 22 with other participants in the communications session. While microphone 36 is receiving audio input, device 12 transmits a signal encoding this audio input using media path 20 and transmits input notifications on signaling path 22. While paths 20 and 22 are illustrated separately, system 10 contemplates both signaling and media streaming occurring on one link between participants in the session. In a particular embodiment, devices 12 establish a packet-based communications session in which audio signals are encoded into packets for transmission. Device 12 may use additional packets, separate from the stream of audio packets, to send input notifications. Alternatively, devices 12 may embed the input notifications into selected packets in the stream of audio packets.

While the example shown illustrates specific functional modules within device 12, the functionality of these modules may be combined or separated into smaller functional units, and each individual functionality may be implemented using any suitable hardware and/or software, such as a computer program stored on a computer readable medium. In addition, device 12 may include fewer, different, or additional functional modules depending on the specific implementation. For example, in a particular embodiment, device 12 is a computer executing communications software. In this embodiment, device 12 may provide a graphical user interface for user interaction.

Figure 3:
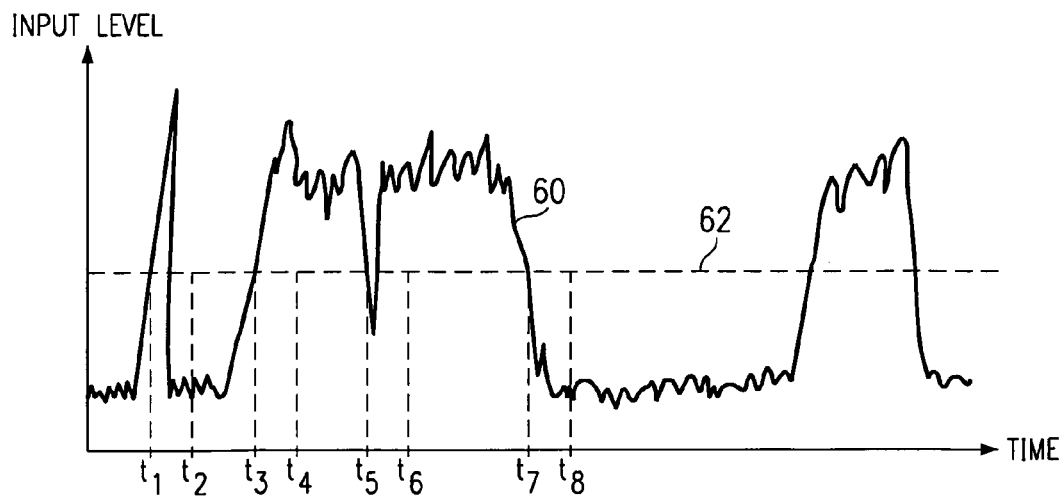
FIG. 3 is a graph illustrating the operation of the communications device in processing audio input.

FIG. 3 is a graph illustrating the operation to generate input notifications in response to audio input received by microphone 36. Trace 60 indicates the level of audio input received by device 12 using microphone 36. This value may be determined using any suitable technique. For example, it may represent an instantaneous value, a filtered value, running average, or other appropriate measurement. Trace 62 indicates the input level threshold used by input detector 46. Using this exemplary graph, timing and thresholds for the generation of input notifications for a particular embodiment may be more clearly understood.

The time window between $t_1$ and $t_2$ illustrates a spike filter that prevents the generation of input notifications based on brief noises. Because the audio input level does not remain above the threshold during this time window, controller 40 will not generate an input notification based on this audio input. Thus, brief noise spikes, such as a door slamming, will not trigger an input notification.

During the next time window, between time $t_3$ and $t_4$, the audio input level consistently remains above the input level threshold. Thus, at time $t_4$, controller 40 generates an input notification and communicates this notification to other participants in the communications session. At time $t_5$, the audio input level falls below the input level threshold. However, the input does not remain below the input level threshold for the entire time window between time $t_5$ and $t_6$. Thus, controller 40 may disregard this temporary lull in audio input, determining that the user's speech has effectively been continuous.

At time $t_7$ the user's speech ceases, and the audio input level falls below the input level threshold. Since the audio input level remains below the input level threshold during the time window between time $t_7$ and $t_8$, controller 40 determines that the user has ceased speaking. Thus, controller 40 may communicate a notification indicating the end of audio input to the other participants in the communications session. Alternatively, controller 40 may periodically communicate input notifications to the other participants so long as continuous audio input exceeding the input level threshold is detected. For example, controller 40 would communicate these notifications at regular intervals between time $t_3$ and $t_7$.

In this example, controller 40 uses several different timing windows and one input level threshold. However, device 12 contemplates using multiple input level thresholds and/or timing windows to determine the appropriate generation and communication of input notifications. For example, a different input level threshold may be used to detect the beginning of a user's speech than is used to detect the end of the speech. Also, multiple time thresholds may be used to maximize the performance of device 12. For example, different window sizes may be used for detecting the beginning of a user's speech and detecting the end of a user's speech. Moreover, an additional time threshold may be used for periodically communicating input notifications. System 10 contemplates using any suitable parameters, measurements, or modeling of speech patterns to determine the beginning and end of speech.

In addition to communicating the input notifications on signaling path 22, device 12 also communicates a signal encoding the audio input on media path 20. In a particular embodiment, device 12 transmits the audio signal regardless of whether the audio input exceeds the input level threshold. This allows the remote participants to determine the appropriate output of these audio signals. For example, consider the session between device A and device B from FIG. 1. Both devices continuously receive input at various levels using their microphones, and each device continuously streams this input, regardless of it level, on media path 20. However, only when one of the participants receives input that meets the input criteria will that device generate a notification. Thus, each device may continuously receive a stream of input from other participants. Yet, only when a notification is received will a participant enable its speaker and output the signal received on media path 20.

Using this method allows each participant to determine the most effective noise suppression techniques to use. A participant in a session may choose not to use this technique, while others in the session continue relying on input notifications. For example, a user of device A may choose to disable the speaker control feature. Device A would then enable its speaker and disregard input notifications. However, device A would also continue to generate notifications to allow device B to continue operating with the active speaker control.

Because each device 12 participating in a communications session relies on input notifications from other participants, initial setup of the session may be used to set up the use of input notifications. Each participant in the session should be aware that input notifications will be used, how they are to be used, and be equipped to generate notifications. Thus, during setup of a communications session, participants may negotiate the use of input notifications using any suitable method. For example, an initial call request may also request that input notifications be used and specify parameters. These parameters may detail thresholds, timeout values, or other information, or participants may negotiate these and other parameters during call setup or later in the session.

Moreover, devices 12 may establish a session without setting up notifications and then during the session determine that input notifications should be enabled. For example, if device 12 or a user determines that there is too much noise in the conversation, device 12 or its user may initiate a request to begin using input notifications. Devices 12 participating in the session then negotiate the use of notifications and begin using the described speaker control methods if negotiations are successful.

Figure 4:
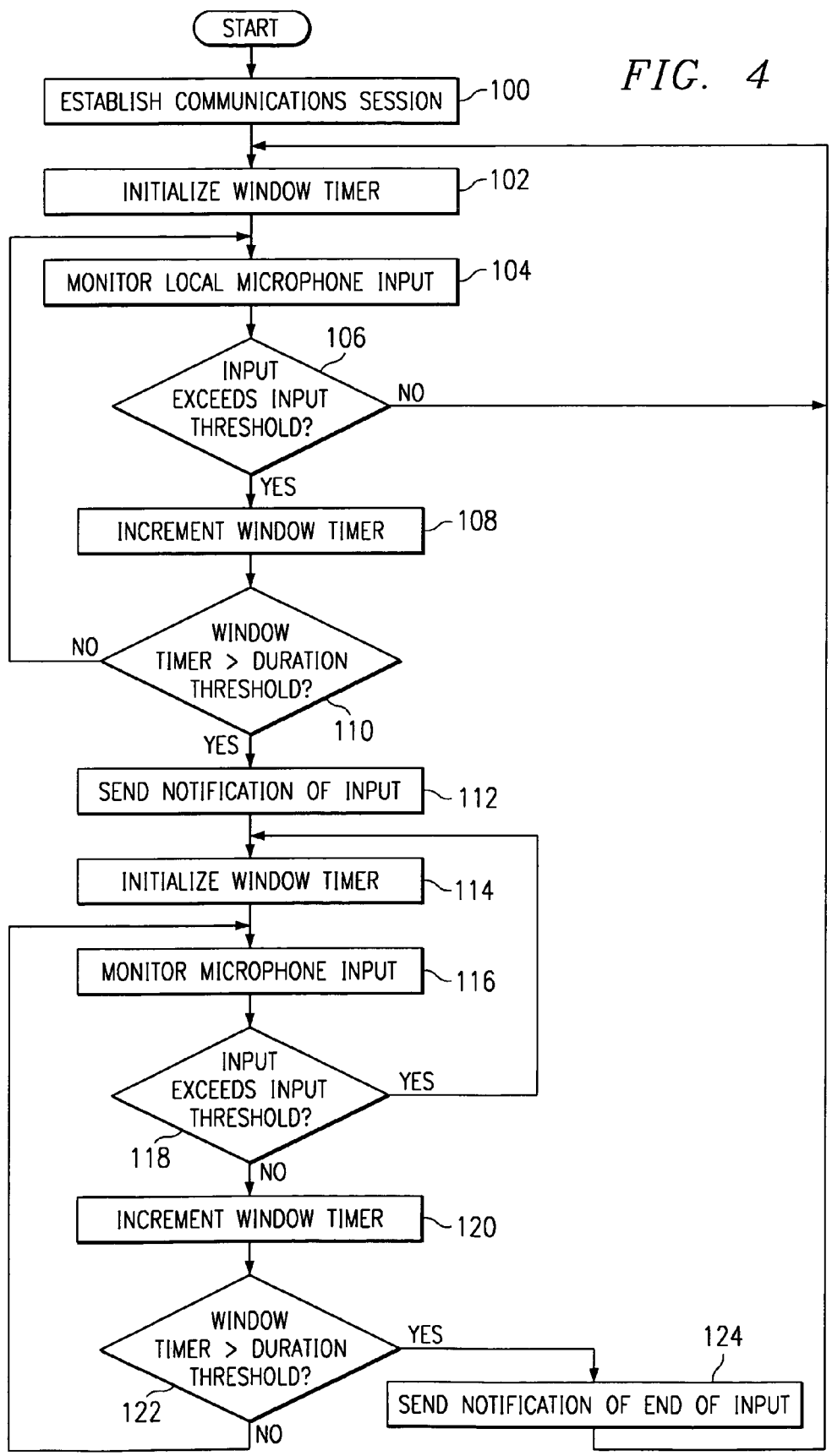
FIG. 4 is a flowchart illustrating a method for processing audio input using the communications device.

FIG. 4 is flowchart illustrating a method for monitoring audio input and communicating input notifications to other participants in a communications session. Device 12 establishes a communications session with remote participants at step 100. This establishes media path 20 and signaling path 22 between all of the participants. In the following steps, from 102 to 110, device 12 monitors audio input received by microphone 36 and determines whether to send input notifications to the remote participants. Device 12 initializes a window timer at step 102. This window timer allows device 12 to track the duration of audio input received by microphone 36. Device 12 monitors audio input of microphone 36 and determines whether this input exceeds an input threshold at steps 104 and 106.

If the audio input does not exceed the input threshold, device 12 reinitializes the window timer at step 102. However, if the audio input exceeds the input threshold, device 12 increments the window timer and determines whether the window timer is greater than a duration threshold at steps 108 and 110. The duration threshold indicates the duration of audio input necessary to trigger an input notification. If the window timer is not greater than the duration threshold, device 12 continues monitoring microphone input at step 104. If the window timer is greater than the duration threshold, device 12 sends a notification of input to the remote participants at step 112.

After sending input notification to the remote participants, the operation of device 12 depends upon the specific method used for signaling between participants in the communications session. Specifically, system 10 contemplates devices 12 using various methods to signal the end of input. In this example, device 12 sends a notification when input is detected and then sends a notification at the end of the audio input. Thus, at steps 114–122, device 12 monitors audio input received using microphone 36 to determine when to notify the remote participants of the end of audio input. Device 12 initializes the window timer at step 114. In this loop, the window timer allows device 12 to track the length of drops in audio input.

Device 12 monitors audio input received using microphone 36 and determines whether this input exceeds an input threshold at steps 116 and 118. As previously discussed, device 12 may use the same value for this input threshold as is used in step 106, or may use a different value. If the audio input exceeds the input threshold, device 12 reinitializes the window timer at step 114. Thus, so long as the input remains above the threshold, the timer will not run. However, if the input does not exceed the input threshold, device 12 increments the window timer and determines whether the window timer is greater than a duration threshold at steps 120 and 122. As with the input threshold, this duration threshold may have the same value as the duration threshold in step 110 or may have a different value.

If the window timer is not greater than the duration threshold, device 12 continues monitoring audio input of microphone 36 at step 116. If the window timer is greater than the duration threshold, then audio input has remained below the input threshold for greater than the duration threshold, and thus device 12 sends a notification of the end of audio input to the remote participants at step 124. After sending the end of input notification, device 12 resumes the first loop (steps 102–110) to determine when to send a notification of audio input.

While the steps in this flowchart are presented in a particular order, system 10 contemplates many of these steps taking place substantially simultaneously and/or in a different order. In addition, device 12 may support different or multiple techniques for notifying remote participants of audio input. For example, device 12 may continuously loop through the first loop, monitoring input and sending notifications when the audio input exceeds the input threshold. This would result in periodic input notifications so long as audio input continued to be detected. At the same time, device 12 may also monitor the input and generate end of input notifications when the input falls below an input threshold for a given period of time. Thus device 12 could send periodic input notifications and send an end of input notification. Moreover, device 12 may only send periodic input notifications, without generating any end of input notifications.

Figure 5:
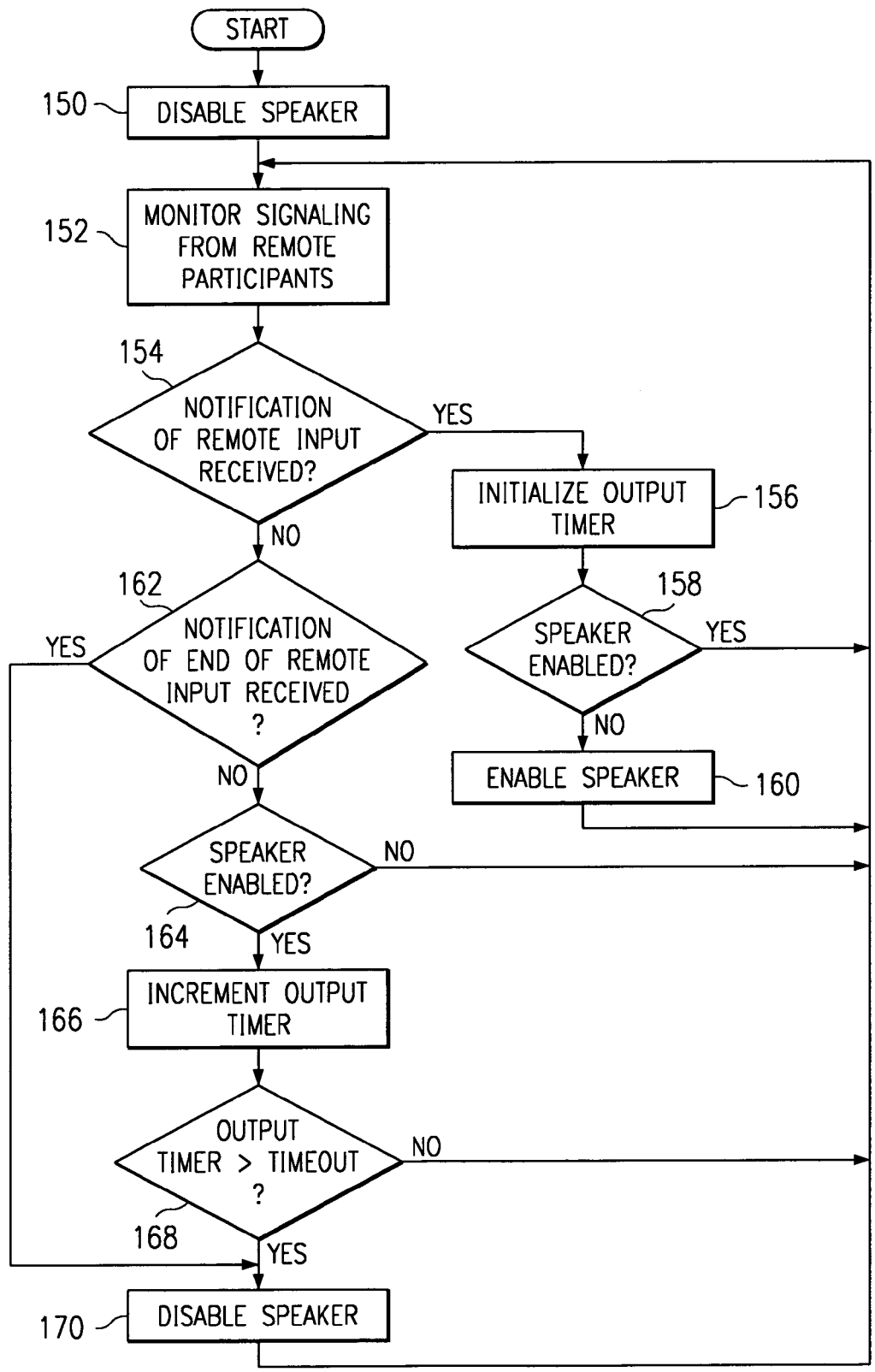
FIG. 5 is a flowchart illustrating a method for controlling the output of the communications device based on remote signaling.

FIG. 5 is a flowchart illustrating a method for output control of speaker 38 during a communications session. Initially, device 12 disables speaker 38 at step 150. As previously discussed, device 12 may allow some small amount of output while speaker 38 is disabled. Device 12 monitors signals and determines whether a notification of remote input has been received from a remote participant at steps 152 and 154.

If a notification of remote input is received, device 12 must ensure that speaker 38 is enabled and that an output timer is initialized. Device 12 uses the output timer to determine how long speaker 38 has been enabled. Device 12 initializes the output timer at step 156 and determines whether speaker 38 is enabled at step 158. If speaker 38 is already enabled, device 12 resumes monitoring signals at step 152. Otherwise, device 12 enables speaker 38 at step 160 before returning to monitoring signals at step 152. By reinitializing the output timer each time a remote input notification is received, device 12 allows remote participants to periodically indicate that they are receiving audio input. Using the output timer with a timeout value obviates the need for end of input notifications. However, this example provides logic for handling both periodic input notifications and end of input notifications.

If no notification of remote input is received at step 154, device 12 determines whether a notification of the end of remote input has been received from a remote participant at step 162. If so, device 12 ensures that speaker 38 is disabled at step 170. However, in a communications session involving more than two participants, device 12 must further determine whether all remote participants that previously indicated remote input have indicated an end of that input before disabling speaker 38 at step 164. Otherwise, if two or more remote participants were indicating input, an end of input notification from one of them would cause device 12 to disable speaker 38.

If no notifications have been received, device 12 determines whether speaker 38 is enabled at step 164. If not, device 12 continues monitoring signals from remote participants at step 152. If speaker 38 is enabled, device 12 increments the output timer and determines whether the output timer is greater than a timeout value at step 166 and 168. If the output timer is not greater than the timeout, device 12 maintains speaker 38 in an enabled state and continues monitoring signals at step 152. However, if the output timer exceeds the timeout value, device 12 disables speaker 38 at step 164 and then resumes monitoring signals at step 152.

During a communications session, each participant may continuously stream media, including audio, on media path 20. Thus each participant may continuously transmit signals encoding audio input, regardless of whether it exceeds any thresholds, to the other participants in the communications session. The speaker control illustrated in this flowchart allows each device 12 to determine whether or not to output any audio signals received on media path 20. By enabling speaker 38 only when at least one remote participant is speaking, the output of spurious signals will be prevented at all other times.

The preceding flowcharts illustrate only exemplary methods for signaling among participants in a communications session and controlling the output of speaker 38 based upon this signaling. System 10 contemplates many of the steps in these flowcharts taking place simultaneously and/or in different order than as shown. Furthermore, system 10 contemplates using methods with additional steps, fewer steps, or different steps, so long as the methods remain appropriate for sharing operational information among participants in a communications session to suppress the output of spurious signals.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for communicating with a remote device comprising:
   negotiating, between a local device and a remote device, an input level threshold and an input time threshold;
   receiving, at the local device, a remote input notification, the remote input notification received from a remote location, the remote input notification indicating that the remote device has received an audio input exceeding the input level threshold for longer than the input time threshold;
   receiving a signal encoding the audio input from the remote device, the remote input notification being other than the signal encoding the audio input;
   enabling a local output component responsive to the notification; and
   generating an output using the local output component based on the signal.

2. The method of claim 1, further comprising:
   initializing a timer upon receiving the remote input notification;
   incrementing the timer;
   reinitializing the timer if a second remote input notification is received; and
   disabling the local output component if the timer exceeds a notification time threshold.

3. The method of claim 2, wherein disabling the local output component comprises setting an output level of the local output component to a first value to prevent substantially all output from the local output component.

4. The method of claim 3, wherein the output level determines an intensity range for output generated by the local output component.

5. The method of claim 1, further comprising:
   receiving an end of input notification from the remote device; and
   disabling the local output component responsive to the end of input notification.

6. The method of claim 1, wherein the local output component comprises a speaker, and the remote device uses a microphone to receive the audio input.

7. The method of claim 1, further comprising:
   receiving a local audio input using a local input component;
   determining that the local audio input exceeds the input level threshold;
   generating a local input notification based on the determination;
   generating a signal encoding the local audio input; and
   communicating the local input notification and the signal encoding the local audio input to the remote device.

8. A voice communications device, comprising:
   an output component operable to generate output at an output level;
   an interface; and
   a controller operable to:
      establish a communications session with a remote device using the interface;
      negotiate an input level threshold and an input time threshold with the remote device;

receive a remote input notification from the remote device, wherein the remote input notification indicates that the remote device has received an audio input exceeding the input level threshold for longer than the input time threshold;

enable the output component responsive to the remote input notification;

receive a signal encoding the audio input from the remote device the remote input notification being other than the signal encoding the audio input from the remote device;

generate an output based on the signal using the output component.

9. The communications device of claim 8, wherein the controller is further operable to:

initialize a timer upon receiving the remote input notification;

increment the timer;

reinitialize the timer if a second remote input notification is received; and disable the output component if the timer exceeds a notification time threshold.

10. The communications device of claim 9, wherein the controller is further operable to disable the output component by setting the output level of the output component to a first value to prevent substantially all output from the output component.

11. The communications device of claim 10, wherein the output level determines an intensity range for output generated by the output component.

12. The communications device of claim 8, wherein the controller is further operable to:

receive an end of input notification from the remote device; and disable the output component responsive to the end of input notification.

13. The communications device of claim 8, wherein the controller is further operable to:

detect a local audio input received using a local input component;

determine that the local audio input exceeds the input level threshold;

generate a local input notification based on the determination;

generate a signal encoding the local audio input; and communicate the local input notification and the signal to the remote device.

14. A computer program for communicating with a remote device, the computer program embodied in a computer readable medium and operable to:

negotiate an input level threshold and an input time threshold with the remote device;

receive a remote input notification from a remote location indicating that the remote device has received an audio input exceeding the input level threshold for longer than the input time threshold;

receive a signal encoding the audio input from the remote device the remote input notification being other than the signal encoding the audio input;

enable a local output component responsive to the notification; and generate an output using the local output component based on the signal, wherein spurious signals in the output are suppressed while the local output component is disabled.

15. The computer program of claim 14, further operable to:

initialize a timer upon receiving the remote input notification;

increment the timer;

reinitialize the timer if a second remote input notification is received; and disable the local output component if the timer exceeds a notification time threshold.

16. The computer program of claim 14, further operable to:

receive an end of input notification from the remote device; and disable the local input component responsive to the end of input notification.

17. The computer program of claim 14, further operable to disable the local output component by setting an output level of the local output component to a first value to prevent substantially all output from the local output component.

18. The computer program of claim 17, wherein the output level determines an intensity range for output generated by the local output component.

19. The computer program of claim 14, further operable to:

receive a local audio input using a local input component;

determine that the local audio input exceeds the input level threshold;

generate a local input notification based on the determination;

generate a signal encoding the local audio input; and communicate the local input notification and the signal encoding the local audio input to the remote device.

20. A communications system, comprising:

a first communications device having a first input component and a first output component, the first communications device operable to establish a communications session with a second communications device remote from the first communications device, negotiate an input level threshold and an input time threshold with the second communications device, determine an audio input received by the first input component exceeded the input level threshold for longer than the input time threshold, notify the second communications device that the first input component received the audio input, and communicate a signal encoding the audio input to the second communications device the notification of the second communications device being other than the signal encoding the audio input; and the second communications device having a second input component and a second output component, the second communications device operable to receive the notification from the first communications device, enable the second output component responsive to the notification, and generate an output based on the signal using the second output component.

21. The communications system of claim 20, wherein the first input component and the second input component each comprise a microphone, and the first output component and the second output component each comprise a speaker.

22. The communications system of claim 20, wherein the communications session comprises:

a media path comprising signals encoding audio inputs; and a signaling path for communicating notifications, wherein the notifications allow the first communications device and the second communications device to suppress the output of spurious signals in the media path.

23. The communications system of claim 22, wherein the media path and the signaling path comprise separate communications streams between the first communications device and the second communications device.

24. The communications system of claim 22, wherein:
the media path comprises a communications stream between the first communications device and the second communications device; and
the signaling path comprises notifications inserted into the media path.

25. A voice communications device comprising:
means for negotiating an input level threshold and an input time threshold between the voice communication device and a remote device;
means for receiving, at the voice communication device, a remote input notification from a remote location, the remote input notificaiton indicating that the remote device has received an audio input exceeding the input level threshold for longer than the input time threshold;
means for receiving a signal encoding the audio input from the remote device, the remote input notification being other than the signal encoding the audio input;
means for enabling the local output component responsive to the notification; and
means for generating an output using the local output component based on the signal.

26. The communications device of claim 25, further comprising means for disabling the local output component by setting an output level of the local output component to a first value to prevent substantially all output from the local output component.

27. The communications device of claim 26, wherein the output level determines an intensity range for output generated by the local output component.

28. The communications device of claim 25, wherein the remote input notification indicates that the audio input exceeded an input level threshold for longer than an input time threshold.

29. The communications device of claim 25, further comprising:
means for initializing a timer upon receiving the remote input notification;
means for incrementing the timer;
means for reinitializing the timer if a second remote input notification is received; and
means for disabling the local output component if the timer exceeds a notification time threshold.

30. The communications device of claim 25, further comprising:
means for receiving an end of input notification from the remote device; and
means for disabling the local output component responsive to the end of input notification.

31. The communications device of claim 25, further comprising:
means for receiving a local audio input using a local input component;
means for determining that the local audio input exceeds the input level threshold;
means for generating a local input notification based on the determination;
means for generating a signal encoding the local audio input; and
means for communicating the local input notification and the signal encoding the local audio input to the remote device.

* * * * *